(12) United States Patent
Bannai et al.

(10) Patent No.: US 6,503,656 B1
(45) Date of Patent: Jan. 7, 2003

(54) METHOD FOR PRODUCTION OF BATTERY

(75) Inventors: Yutaka Bannai, Tokyo (JP); Hiroshi Yageta, Tokyo (JP); Masaharu Satoh, Tokyo (JP); Etsuo Hasegawa, Tokyo (JP); Masato Shirakata, Tokyo (JP)

(73) Assignee: NEC Corporation, Tokyo (JP)

( * ) Notice: Subject to any disclaimer, the term of this patent is extended or adjusted under 35 U.S.C. 154(b) by 141 days.

(21) Appl. No.: 09/598,704

(22) Filed: Jun. 21, 2000

(30) Foreign Application Priority Data

Jun. 24, 1999 (JP) .......................................... 11-178771

(51) Int. Cl.$^7$ ................................................ H01M 2/08
(52) U.S. Cl. ........................ 429/162; 429/185; 29/623.2
(58) Field of Search ................................ 429/162, 185; 29/623.1, 623.2

(56) References Cited

U.S. PATENT DOCUMENTS

| | | | | |
|---|---|---|---|---|
| 5,004,655 A | * | 4/1991 | Symanski | ............... 429/185 X |
| 5,227,264 A | * | 7/1993 | Duval et al. | ............ 429/185 X |
| 5,650,243 A | * | 7/1997 | Ferment | ................. 429/185 X |
| 5,972,054 A | * | 10/1999 | Yotsuyanagi et al. | ...... 29/623.1 |

FOREIGN PATENT DOCUMENTS

| | | |
|---|---|---|
| JP | 5-129008 | 5/1993 |
| JP | 5-343038 | 12/1993 |
| JP | 6-334207 | 12/1994 |
| JP | 7-37559 | 2/1995 |
| JP | 7-78604 | 3/1995 |
| JP | 11-86807 | 3/1999 |

* cited by examiner

Primary Examiner—Stephen Kalafut
(74) Attorney, Agent, or Firm—Sughrue Mion, PLLC

(57) ABSTRACT

A battery with a laminated film as a casing encapsulating the battery power source is manufactured by the steps of: heat sealing the sealing area of the laminated film, whereby encapsulating the battery power source in the laminated film; and irradiating, with an electron beam, a portion of the heat sealed area, thereby the irradiated area crosses, in the direction along the peripheries of the heat sealed area, the overlapping areas of the heat sealed area and the leading electrodes projecting toward outside from the positive electrode and the negative electrode. According to this method, produced is a battery having a high peeling strength at the position of terminals of leading electrodes without sacrificing battery properties and therefore having high reliability and safety.

27 Claims, 8 Drawing Sheets

METHOD FOR PRODUCTION OF BATTERY

BACKGROUND OF THE INVENTION (1) Field of the Invention

The present invention relates to a method for producing a battery. More particularly, the present invention relates to a method for producing a battery of high reliability which uses a laminated film as the casing.

(2) Description of the Prior Art

In recent years, portable type electronic appliances have become smaller in size and lighter in weight. In this connection, the batteries used therein as an energy source are required to follow the same trend. The lithium secondary battery, which is currently popular among the above batteries, uses an electrolytic solution and therefore needs a rigid casing (e.g. a metal can) for leakage protection, etc.; therefore, the battery is thought to have a limit in weight reduction or thickness reduction. In order to realize the weight reduction and/or thickness reduction of the battery, it is necessary to use a polymer gel or the like in place of an electrolytic solution and further use a casing other than a metal can. As a casing used for such a purpose, there is ordinarily used a laminated film obtained by laminating (1) an aluminum foil having a higher resistance to the transmission of water or organic electrolytic solution than polymer resin films have and (2) a polymer resin film. In such a laminated film, a synthetic resin film with high heat-sealability, such as polyethylene film, polypropylene film or the like is used as a sealing layer; and a film such as polyester film or the like is used as a protective layer. In sealing the battery, a battery power source comprising a positive electrode, a negative electrode and an electrolyte is interposed between two laminated films and the peripheral areas of the two laminated films surrounding the battery power source are heat sealed with each other using a heating means.

The conventional sealing of a battery, which comprises pressure-bonding a polyethylene, a polypropylene or the like only by heat sealing has a problem in that the sealed area formed is insufficient in heat resistance at temperatures of 100° C. or higher and gives rise to peeling caused by resin softening, etc. There is also a problem in that the sealing strength of the sealed area is low even at ordinary temperature and the sealed area gives rise to peeling when the internal pressure of battery rises owing to, for example, the expansion of battery power source or the generation of gas inside battery; in an extreme case, leakage of electrolytic solution takes place and the reliability and safety of battery decrease.

It is disclosed in JP-A-11-86807 that when a positive electrode, a negative electrode, an electrolytic solution, etc. are placed in a bag made of a laminated sheet of a metal foil and a plastic layer, the bag is heat-sealed, and the sealed bag is subjected to a radiation treatment, the resulting bag shows effective prevention of liquid leakage. The literature describes, as the method for radiation treatment, application of radiation to a cardboard box containing batteries or to batteries arranged on a conveyor. The literature also describes that as the radiation, not only a γ-ray but also an electron beam can be used; however, no specific example is given about the use of an electron beam in the literature.

An investigation by the present inventor indicates that, in the technique described in JP-A-11-86807, the irradiation of a battery power source with an electron beam causes decomposition of electrolytic solution, etc., resulting in reduction in battery performance. Further, no sufficient adhesion is obtained at the parts where the lead electrode extending from a positive electrode or a negative electrode and a laminated film are adhered to each other (these parts are sites at which liquid leakage occurs most easily).

Also, JP-A-7-78604 discloses a battery structure obtained by interposing a battery power source between two sheet-shaped terminals also functioning as a positive electrode current collector and a negative electrode current collector, via a sealing material and subjecting the sealing material to heat sealing; the heat sealed layer has improved heat resistance when, as the sealing material, a modified polyethylene beforehand irradiated with an electron beam is used. This technique relates to the modification of a sealing material alone and is different from a technique for improvement of adhesivity and sealing strength in a battery structure obtained by sealing a battery power source using a laminated film as the casing.

It is known to form, in a battery, a safety valve for releasing a gas outside, in order to prevent the bursting of battery when the gas pressure inside battery has increased. It is described in, for example, JP-A-11-86823 to form, in the sealed area of a battery structure using a laminated film as the casing, a part having a pressure resistance lower than that of the other major sealed part so that the gas release from the part of lower pressure resistance is made possible when the pressure inside battery has increased. In this technique of forming a part of lower pressure resistance in a sealed area, a material different from that of other major sealed part need be used for the part of lower pressure resistance, making the battery production complicated; further, since the whole sealed area is formed by heat sealing, the overall heat resistance is insufficient.

SUMMARY OF THE INVENTION

In view of the above-mentioned problems of the prior art, the objective of the present invention is to provide a method for producing a battery using a laminated film as the casing, which battery has a high sealing strength, particularly a high peeling strength at the terminals of leading electrodes without sacrificing battery performances and therefore has high reliability and safety.

Another objective of the present invention is to provide a method for producing, at high productivity and easily, a battery using a laminated film as the casing, which battery has high strength at the whole sealed area, is provided with a safety mechanism allowing gas release from a particular site when the pressure inside battery has increased owing to the happening of an abnormality, and has high reliability and safety.

Accordingly, the present invention is directed to a method for producing a battery, comprising a battery power source having a positive electrode, a negative electrode and an electrolyte, and a laminated film of a metal foil and a polymer resin layer as a casing encapsulating the battery power source therein;

the method comprising the steps of:

heat sealing the sealing area of the laminated film, whereby encapsulating the battery power source in the laminated film; and irradiating, with an electron beam, a portion of the heat sealed area, thereby the irradiated area crosses, in the direction along the peripheries of the heat sealed area, the overlapping areas of the heat sealed area and the leading electrodes projecting toward outside from the positive electrode and the negative electrode.

By thus irradiating the heat sealed area of the laminated film with an electron beam, a crosslinked structure is formed in the heat sealed area. Thereby, the resin in the laminated film has improved heat resistance and also has improved adhesivity, i.e. improved sealing strength. That is, in the area where the two films have been heat sealed and welded to each other, the resins of the two films are thermally melted, mixed and, moreover, bonded strongly by crosslinking. By irradiating, in particular, the overlapping areas of the heat sealed area and the leading electrodes, with an electron beam, the parts of the polymer resin layer contacting with the leading electrodes can have improved heat resistance and improved sealing strength; as a result, it is possible to prevent liquid leakage and produce a battery having high reliability.

Another aspect of the present invention is directed to a method for producing a battery, comprising a battery power source having a positive electrode, a negative electrode and an electrolyte, and a laminated film of a metal foil and a polymer resin layer as a casing encapsulating the battery power source therein;

the method comprising the steps of:

heat sealing the sealing area of the laminated film; and irradiating at least part of the heat sealed area of the laminated film with an electron beam while preventing the battery power source from being irradiated with the electron beam.

By thus preventing the battery power source from being irradiated with an electron beam, there can be produced a battery which has a high sealing strength, particularly a high peeling strength at the terminals of leading electrodes without sacrificing the battery performances, even when there is used an electrolyte containing, for example, a salt easily decomposing upon irradiation with an electron beam, such as $LiPF_6$.

When the irradiation with an electron beam is conducted to the whole length in the direction along peripheries of-the heat sealed area surrounding the battery power source, the whole circumference of battery has improved sealing strength and a battery of high reliability can be produced.

In the present invention, a portion of the heat sealed area in the direction along the peripheries of the heat sealed area surrounding battery power source may not be irradiated with an electron beam. By thus allowing a portion of the sealed area not to be irradiated with an electron beam, this part (electron beam-unirradiated part) has lower peeling strength than the electron beam-irradiated part and, once abnormal pressure increase arises inside the battery, causes peeling preferentially; therefore, the part can be used as a safety mechanism for gas release. This is advantageous in that the peeling position, that is, the gas releasing position becomes predictable. The present method can produce a battery having such a safety mechanism, at high productivity.

BRIEF DESCRIPTION OF THE DRAWINGS

FIG. 1(a) is a plan view; FIG. 1(b) is a sectional view taken along the A–A' line of FIG. 1(a); and FIG. 1(c) is a side view seen from the B direction of FIG. 1(a).

DETAILED DESCRIPTION OF THE INVENTION

FIGS. 1(a) to 1(c) schematically show an example of the battery produced according to the present invention. FIG. 1(a) is a plan view; FIG. 1(b) is a sectional view taken along the A–A' line of FIG. 1(a); and FIG. 1(c) is a side view seen from the B direction (the electrode lead side) of FIG. 1(a). This battery has a structure constituted by two laminated films 2 sealed to each other at their peripheries and a battery power source 1 interposed between the two films 2. Electrode leads 3a and 3b connected to a positive electrode and a negative electrode are extruded outside the battery.

The battery power source 1 comprises a positive electrode, a negative electrode and an electrolyte. There is no limitation for a battery power source in the present method for battery production as far as it is usable in ordinary batteries. Therefore, the present invention is used as a method for producing batteries such as a lithium primary battery, a nickel-hydrogen battery, a lithium ion secondary battery, etc. The present invention is preferably used particularly in production of a lithium ion secondary battery, more particularly in production of a battery using a lithium-manganese oxide (preferably a lithium-manganese oxide with spinel structure) as the positive electrode active material. Because use of the lithium-manganese oxide gives a safer battery, and a battery of very high safety can be obtained.

A battery power source used in ordinary lithium ion secondary batteries is produced by placing a positive electrode (obtained by coating, on a positive electrode current collector, a positive electrode active material such as lithium-manganese oxide, lithium cobalt oxide or the like), a negative electrode (obtained by coating a lithium-dopable or dedopable carbon material on a negative electrode collector), and a separator interposing between above two. Then impregnating the resulting material with a lithium salt-containing electrolytic solution of aqueous type or organic solvent type.

Figure 1:
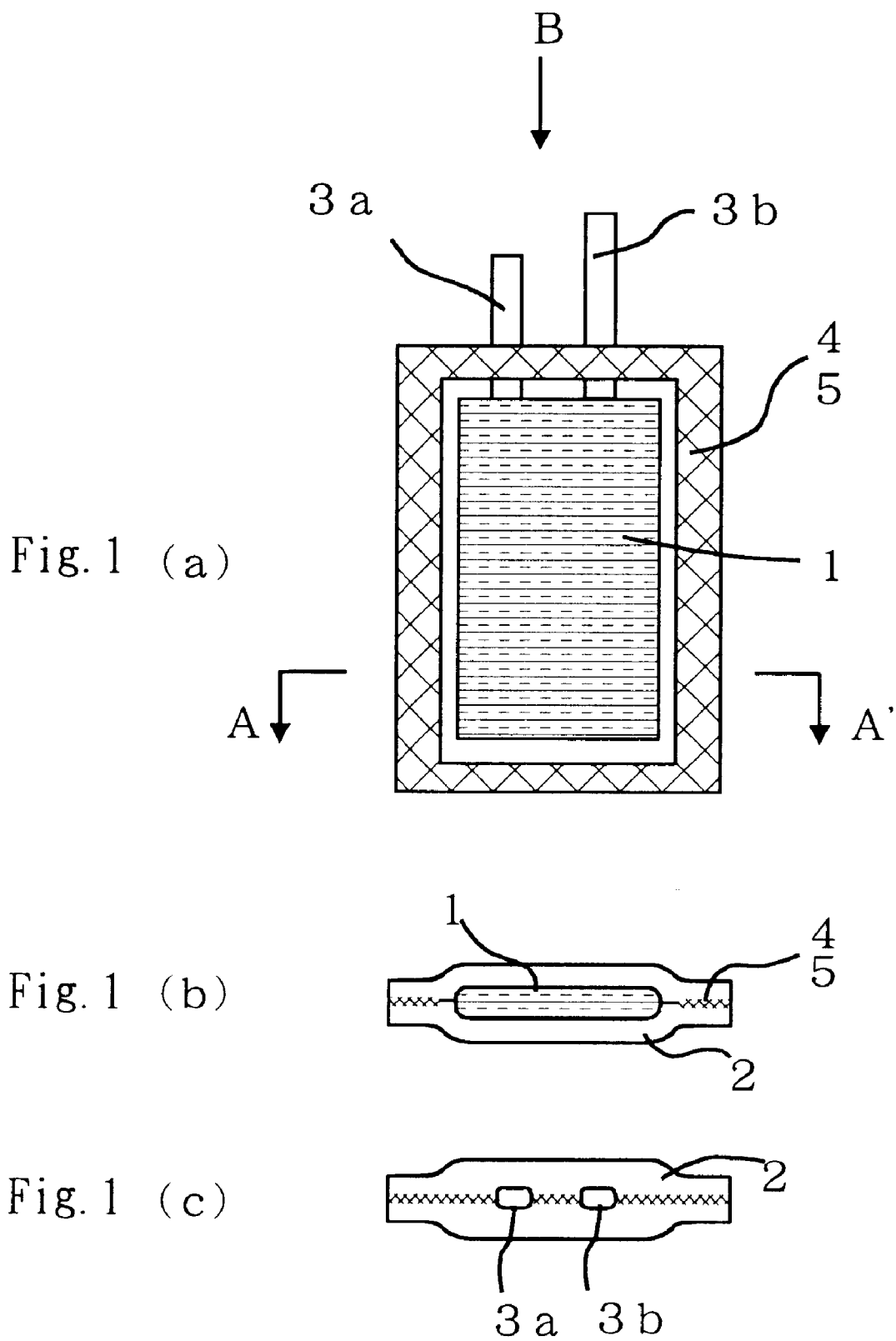
FIGS. 1(a) to 1(c) are drawings showing the structure of a battery produced according to the present invention.

The battery power source used in the present invention has no particular restriction as to the shape. It may be a cylindrical type; however, it is preferably a plate type because it allows easy sealing, and is preferably a prismatic type as shown in FIG. 1. The prismatic type includes a lamination type obtained by laminating a plurality of layers of positive electrodes and negative electrodes via separator (s); a wound type obtained by winding a positive electrode and a negative electrode via a separator; and so forth.

The laminated film used in the present invention is a laminate of a metal foil and a polymer resin layer. The number of layers is not restricted in the laminated film. But it is at least required that the layer at the sealing side of the film (the side facing a battery power source) is comprised of a polymer resin layer which is heat sealable and is effective to electron beam irradiation. An example of the laminated film has a three-layer structure consisting of a polymer resin layer (a sealing layer) at the sealing side, a protective film (e.g. a polyester) at the opposite side, and an aluminum foil interposed between the above two.

The polymer resin layer (sealing layer) of the laminated film is preferably made, at least at the sealing area, of a resin composition which is thermoplastic and heat-sealable and can form a crosslinked structure upon irradiation with an electron beam. For the polymer resin layer, there can be used a single polymer resin, a mixture of polymer resins, or a polymer resin comprising an electron beam-reactive compound (ie. the resin contains or is coated with the electron beam-reactive compound). Even an electron beam-decomposing polymer resin can be used in the form of a resin composition containing an electron beam-reactive compound.

The Example of the polymer resin usable for the present invention includes polymer resins having repeating units represented by —(CH$_2$—CHX)— (X is a substituent such as H, CH$_3$ or the like), such as polyolefin homopolymers such as polyethylene (high-, medium- or low-density polyethylene or linear low-density polyethylene), polypropylene and the like; polyolefin copolymers such as propylene-ethylene copolymer, propylene and/or ethylene-α-olefin (e.g. butene-1) copolymer and the like; modified polyolefins such as ethylene-vinyl acetate copolymer (EVA), ethylene-ethyl acrylate copolymer (EEA), ethylene-methyl acrylate copolymer (EMA), ethylene-glycidyl methacrylate copolymer (EGMA) and the like; and so forth.

Also, even an electron beam-decomposing polymer resin such as polyisobutylene, polymethacrylate, polyvinylidene fluoride or the like can be used when there is added thereto an electron beam-reactive compound such as mentioned below.

There is no particular restriction as to the kind of the electron beam-reactive compound usable together with a polymer resin by mixing or coating, as long as the compound is reactive upon irradiation with an electron beam; however, the electron beam-reactive compound is preferably a multifunctional compound capable of forming a crosslinked structure. As such a compound, there can be used, for aid example, polyfunctional acrylic compounds such as triethylene glycol di(meth)acrylate, trimethylolpropane tri(meth)acrylate, pentaerythritol tetraacrylate, dipentaerythritol hexaacrylate, pentaerythritol triacrylate hexamethylenediisocyanate urethane polymer and the like; monofunctional acrylic compounds such as methyl (meth)acrylate, methoxypolyethylene glycol (meth)acrylate and the like; mixtures of polyfunctional acrylic compound and monofunctional acrylic compound; alicyclic epoxy compounds such as 3,4-epoxycyclohexylmethyl-3',4'-epoxycyclohexane carboxylate, 1,4-(6-methyl-3,4-epoxycyclohexylmethyl carboxylate)butane and the like; and vinyl compounds such as vinylpyrrolidone, vinyl acetate, vinylpyridine, styrene and the like.

Of these, preferred are acrylic compounds from the standpoints of the cost and availability.

Such an electron beam-reactive compound may be mixed into the whole polymer resin layer (sealing layer) or may be coated only on the surface of the sealing area When the electron beam-reactive compound is present in or on the sealing area, there can be prevented the reduction in the strength of sealed area of battery, which reduction is caused by the gas pressure and the curing, decomposition, etc. of sealed layer, all appearing when a large exposure of an electron beam is applied.

Next, examples of the method for battery production according to the present invention are described stepwise.

Figure 6:
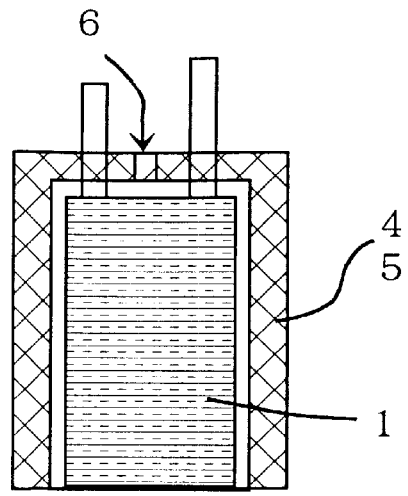
FIGS. 6(a) to 6(c) are drawings for explaining an example of the method for production of battery according to the present invention.
Figure 6:
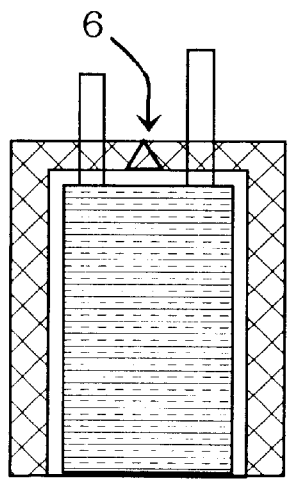
Figure 6:
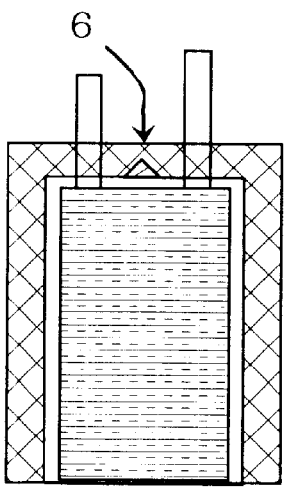

First, a battery power source to which electrode leads have been connected, is wrapped with a laminated film. FIG. 1 shows a form in which a prismatic battery power source is interposed between two laminated films and the four sides of the films are sealed. Other forms are also possible. For example, a laminated film is folded in two and the three sides are sealed (FIG. 6); or, a laminated film is prepared in a bag shape, a battery power source is placed therein, and the mouth of the bag is sealed. Sealing may be done in a curve. The method of sealing is described below on a case using two laminated films.

Figure 2:
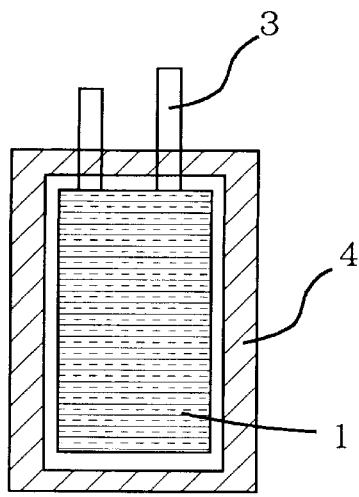
FIG. 2 is a drawing for explaining an example of the method for production of battery according to the present invention.

A battery power source to which electrode leads 3 have been connected is wrapped in two laminated films; then as shown in FIG. 2, the circumferences of the films surrounding the battery power source 1 are heat sealed to form a heat sealed area 4. The conditions of heat sealing such as temperature and the like can be appropriately determined in view of the materials of the polymer resin layer (sealing layer) of the laminated film used.

Figure 3:
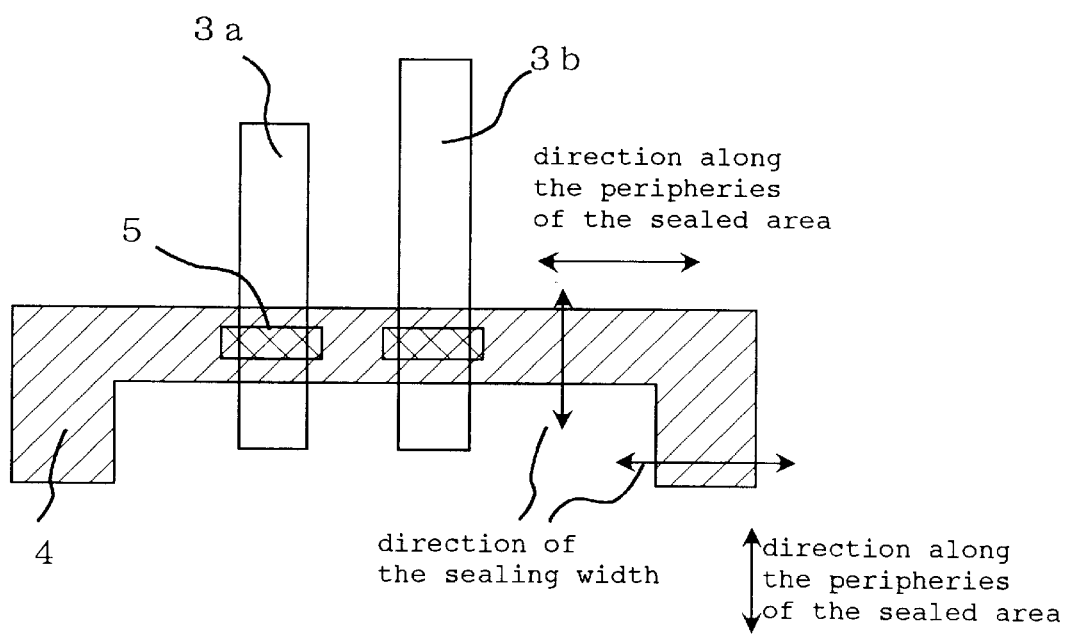
FIG. 3 is a drawing for explaining an example of the method for production of battery according to the present invention.

Next, the heat sealed area is irradiated with an electron beam. In one embodiment of the present invention, as shown in FIG. 3 (an enlarged view of lead electrodes and their vicinities), an electron beam is applied to small parts (electron beam-irradiated parts 5 of FIG. 3) of the heat sealed area 4 which cross the overlapping areas of the heat sealed area 4 and the leading electrodes 3a and 3b in the direction along the peripheries of the sealed area. In ordinary heat sealing, these parts have the smallest adhesion strength but can have improved peeling strength upon irradiation with electron beam.

FIG. 3 shows "direction along the peripheries of the (heat) sealed area" and "direction of sealing width".

In FIG. 3, irradiation is made for parts of the overlapping areas of the heat sealed area 4 and the lead electrodes 3a and 3b; however, it may be made for the whole overlapping areas.

In the present invention, the lead electrodes made of a metal may be extracted in a state in which the metal is not covered, or in a state in which the portions of the lead electrodes corresponding to the sealed area of the laminated film are wrapped with a resin for insulation. Even in the former case (the former state), the irradiated resin portion of the laminated film causes crosslinking, resulting in the improved heat resistance of the resin and the improved adhesivity of the resin to the metal of the lead electrodes. In the latter case (the latter state), the heat sealing between the resin of the laminated film and the resin wrapping the lead electrodes and the crosslinking of the two resins take place, which give improved heat resistance and improved sealing strength. Therefore, in the present invention, the heat resistance and the sealing strength of the lead electrodes portions of battery can be improved; as a result, liquid leakage can be prevented and a battery of high reliability can be produced.

Figure 4:
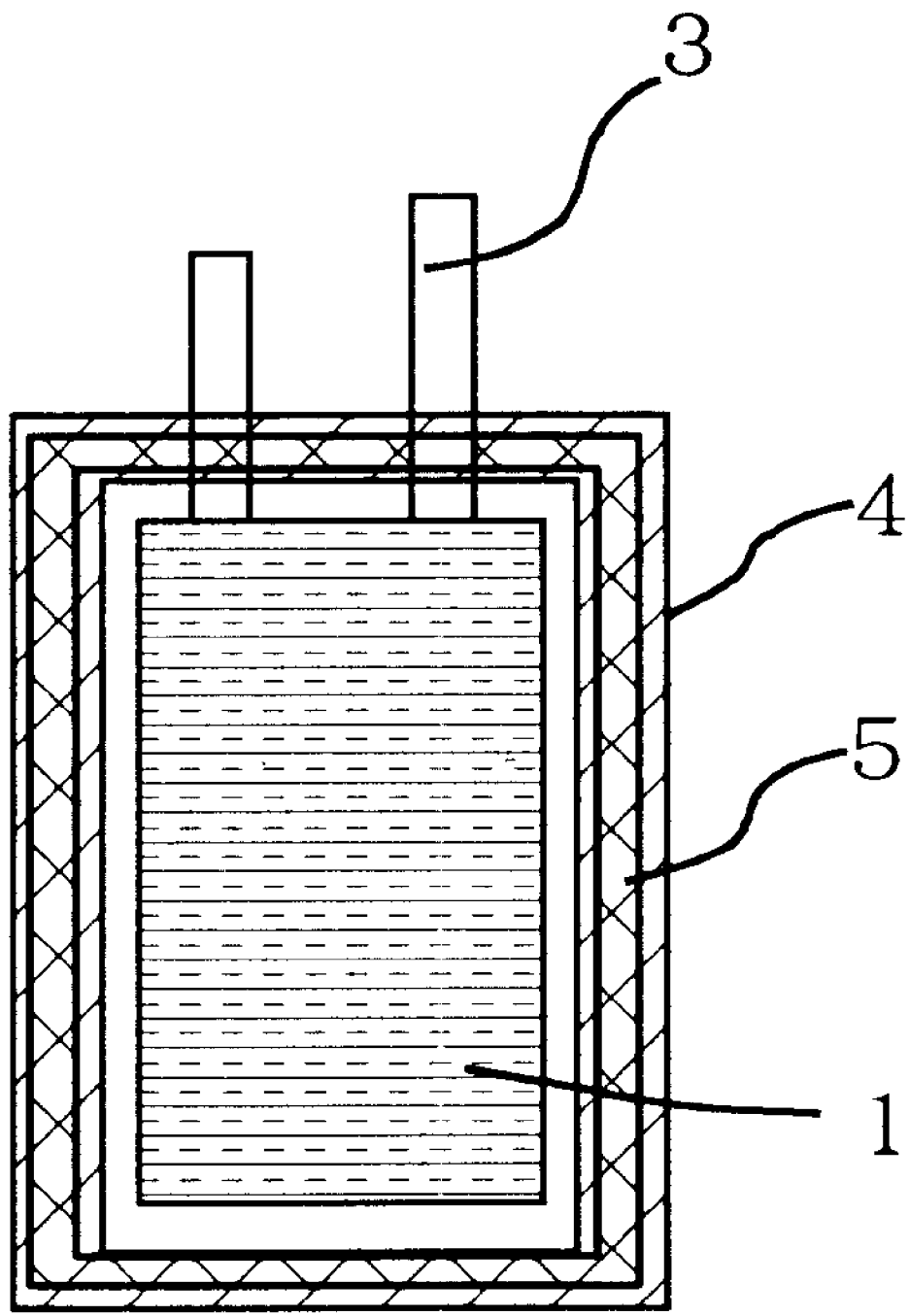
FIG. 4 is a drawing for explaining an example of the method for production of battery according to the present invention.

FIG. 4 is a case in which electron beam irradiation is made to the whole length of the heat sealed area of laminated film surrounding a battery power source. In this case, improvement in strength is achieved in the entire length along the peripheries film. This gives a battery of such high reliability which is not obtainable by the sealing with heat alone. The width in which electron beam irradiation is made, may be the same as the width of the heat sealed area, or may be smaller than that as shown in FIG. 4. The width is preferably the same as the width of heat sealing or smaller than that, for the convenience of mass production.

There is no particular restriction as to the exposure of the electron beam used in the present invention. When the sealing layer comprises no electron beam-reactive compound, if the exposure of the electron beam is too large, the heat sealed area may give rise to expansion caused by gas generation, curing, decomposition, etc.; therefore, the exposure of the electron beam is preferably 40 Mrad or less, more preferably 30 Mrad or less, particularly preferably about 10 to 20 Mrad in view of the efficiency of crosslinking and the protection of sealed area.

When the sealing layer comprises an electron beam-reactive compound, the expansion by gas generation, decomposition, etc. of heat sealed area can be suppressed and, therefore, the exposure of the electron beam can be made large as compared with when the sealing layer comprises no aft electron beam-reactive compound. However, heat generation increases with an increase in electron beam exposure. Hence, the exposure of the electron beam is preferably 50 Mrad or less, more preferably 40 Mrad or less, particularly preferably about 15 to 30 Mrad.

In the present invention, it is preferred that no electron beam irradiation is made particularly to the battery power source. Therefore, it is preferred to control the direction of electron beam or to use shielding means for shielding the electron beam.

The shielding means for shielding of the electron beam may be constituted by placing, between the source of the electron beam and the battery power source, a shield made of a material having such an areal density that can make 0 Mrad the exposure of the electron beam which reaches the battery power source. The example includes a mask having the same shape as the battery power source where the mask is placed between the battery power source and an electron beam applicator; a plate-shaped or concave shield placed on or above (or covering) the battery power source. In view of the convenience of mass production, the means using a plate shaped or concave shield is preferred.

The material for the shield may be, for example, a metal material such as aluminum, iron, lead, titanium, copper or the like; or a glass. A metal material such as aluminum, iron or the like is preferred in view of the processability or moldability.

When the battery power source is shielded from an electron beam, a battery of high sealing strength and high reliability can be produced without sacrificing battery performances such as cycle characteristic, temperature characteristic, internal resistance and the like, even when the battery power source contains a lithium salt which is easily decomposed upon electron beam irradiation, such as $LiPF_6$, $LiBF_4$, $LiN(CF_3SO_2)_2$, $LiN(C_2F_5SO_2)_2$ and the like.

Figure 5:
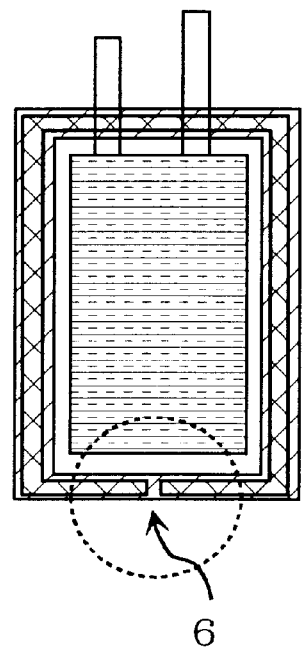
FIGS. 5(a) and 5(b) are drawings for explaining an example of the method for production of battery according to the present invention.
Figure 5:
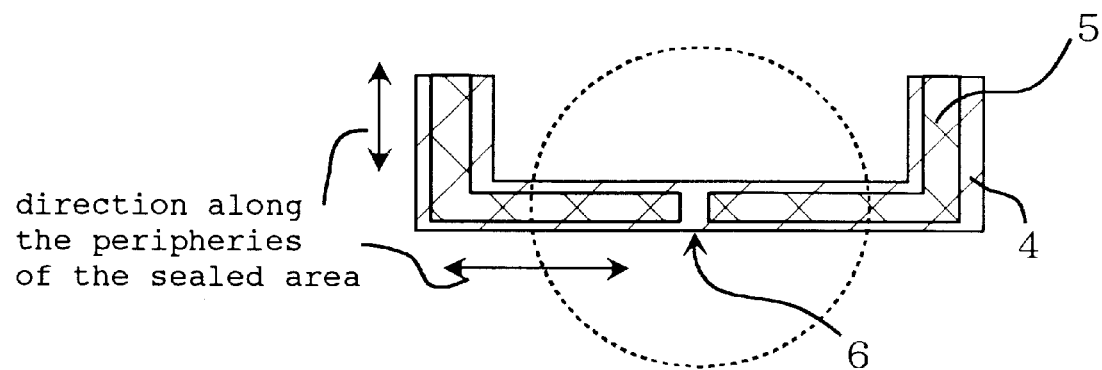

In one embodiment of the present invention, as shown in FIG. 5(a) (a whole view of a battery) and FIG. 5(b) (a partly enlarged view of the FIG. 5(a) battery), an electron beam-unirradiated part 6 is formed in the heat sealed area at a portion in the direction along the pripheries of sealed area.

In this embodiment, the electron beam-irradiated part has high sealing strength while the electron beam-unirradiated part 6 has lower sealing strength than the electron beam-irradiated part 5 because the sealing strength of the part 6 is obtained by heat sealing alone. By thus allowing the sealed area of a battery to have two different sealing strengths, it is possible to form a part which causes peeling in emergency, in the sealed area, and the part can have a function of safety valve. This makes it possible for the manufacturer to predict the peeling position at the time of battery production.

The shape of the electron beam-unirradiated part can be determined as desired; however, it is preferably a simple shape such as rectangular, trapezoidal, triangular or the like in view of the simplicity of the apparatus required. Examples of the shape are shown in FIGS. 6(a) to 6(c). In each of these Examples, a laminated film is folded and sealed at the three sides, and an electron beam-unirradiated part 6 is formed at the side where lead electrodes are extracted. The shape of the electron beam-unirradiated part is rectangular in FIG. 6(a) and triangular in FIG. 6(b). As in FIG. 6(c), the shape may stop in the middle of the width of the heat sealed area. In the example sown in FIG. 6(c), the width of strong sealing obtained by heat sealing and electron beam irradiation is made small at the electron beam-unirradiated part. When the pressure inside battery becomes high, gas leakage occurs through the part, and the part can function as a safety valve.

There is no particular restriction as to the method for forming the electron beam-unirradiated part. When an electron beam shield is used, there can be used a shield 8 of FIG. 7(a) having a tongue-shaped section 9 capable of covering a portion of the heat sealed area of laminated film in the direction of the shielding width; or, a separate shield may be placed on or above a portion of the heat sealed area. The tongue-shaped section 9 of the shield 8 may be the same thickness as other section covering the battery power source of battery, as shown in the sectional view of FIG. 7(b); or, as shown in the sectional view of FIG. 7(c), the tongue-shaped section 9 may have an inclination in thickness. By using such an inclination in thickness, irradiation of electron beam can be made at different exposures, making it possible to obtain a sealing strength which is gradually higher toward the periphery of battery.

The electron beam-unirradiated part may be formed at two or more positions, but is formed ordinarily at one position.

In other embodiment of the present invention, the polymer resin layer (sealing layer) of laminated film is made of a polymer resin containing (or coated with) an electron beam-reactive compound and, in this case, part of the heat sealing area of the polymer resin layer is allowed to contain no electron beam-reactive compound. After heat sealing, even when if the whole part of the heat sealed area has been irradiated with an electron beam, part of the heat sealed area containing no electron beam-reactive compound gives rise to no crosslinking and shows a sealing strength obtained by heat sealing alone while the other part containing the electron beam-reactive compound shows a higher sealing strength owing to the electron beam irradiation. As a result, the same advantage as in the above embodiment forming an electron beam-unirradiated part is obtained. Incidentally, the part of the polymer resin layer containing no electron beam-reactive compound may be or may not be irradiated with an electron beam.

Such polymer resin layer (sealing layer) containing, in part, no electron beam-reactive compound can be easily produced by a coating method in which an electron beam-reactive compound is coated on a polymer resin layer, while making a non-coating area on a specific position.

EXAMPLES

The present invention is specifically described below by using Examples. However, the present invention is in no way restricted to these Examples.

Examples 1 to 4

Figure 8:
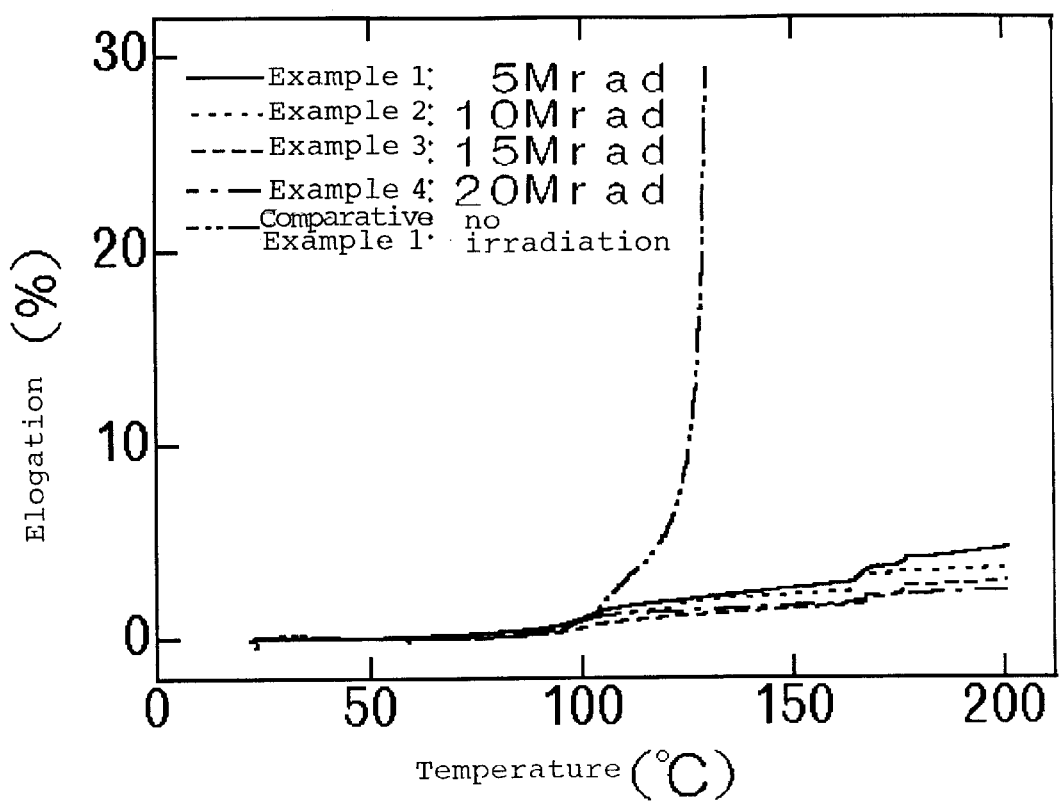
FIG. 8 is a graph showing the heat resistances of the sealed laminated films prepared in Examples 1 to 4 and Comparative Example 1.

Two same laminated films of three layered structure obtainable by laminating a polyethylene resin sheet (as a sealing layer, thickness=100 μm), an aluminum sheet (thickness=50 μm) and a polypropylene sheet (thickness=20 μm) in this order, were heat sealed to each other at 250° C. for 3 seconds using a heating fixture. The resulting laminate was irradiated with an electron beam using an electron beam irradiator having an acceleration voltage of 250 kV. The exposure was 5 Mrad in Example 1, 10 Mrad in Example 2, 15 Mrad in Example 3 and 20 Mrad in Example 4, whereby samples were prepared. The samples were subjected to (1) measurement of T-peel strength at 25° C. to 500 gf at a load-increasing speed of 50 gf/min and (2) measurement of programmed up-heating creep test at a constant load of 5 gf/mm, using a thermomechanical analyzer. The results are shown in Table 1 and FIG. 8. As is clear from Table 1 and FIG. 8, the sealing strength and heat resistance of each sample were sufficient for the required levels of battery, and the effects of electron beam irradiation were striking.

Comparative Example 1

The two same laminated films of Example 1 were used. The same heat sealing as in Example 1 was conducted, but no electron beam irradiation was conducted. The resulting sample was subjected to the same measurements as in Example 1. The results are shown in Table 1 and FIG. 8. As is clear from Table 1 and FIG. 8, neither sealing strength nor heat resistance of the sample of the comparative example satisfied the required levels of battery.

Examples 5 to 8

There were used two same laminated films having four layered structure obtainable by laminating a polypropylene resin sheet (as a sealing layer, thickness=70 μm), a polyethylene terephthalate sheet (thickness=20 μm), an aluminum sheet (thickness=50 mm) and a polyethylene terephthalate sheet (thickness=20 μm) in this order. The two laminated films were heat sealed to each other in the same manner as in Example 1 except that the heating temperature was 300° C. The resulting laminates were irradiated with an electron beam in the same manner as in Example 1. The exposure was 5 Mrad in Example 5, 10 Mrad in Example 6, 15 Mrad in Example 7 and 20 Mrad in Example 8, whereby samples were prepared. The samples were subjected to the same measurements as in Example 1. The results are shown in Table 1. As is clear from Table 1, the sealing strength and heat resistance of each sample were sufficient for the required levels of battery.

Comparative Example 2

The two same laminated films of Example 5 were used. The same heat sealing as in Example 1 was conducted, but no electron beam irradiation was conducted. The resulting sample was subjected to the same measurements as in Example 1. The results are shown in Table 1. As is clear from Table 1, neither sealing strength nor heat resistance of the sample of the comparative example satisfied the required levels of battery.

TABLE 1

|  | Stress at 5% strain in T-peel strength measurement (unit: gf/mm) | Elongation at 200° C. in programmed up-heating creep test (unit: %) |
| --- | --- | --- |
| Example 1 (5 Mrad) | 62 | 4.0 |
| Example 2 (10 Mrad) | 105 | 2.9 |
| Example 3 (15 Mrad) | 118 | 2.5 |
| Example 4 (20 Mrad) | 126 | 2.1 |
| Example 5 (5 Mrad) | 61 | 2.5 |
| Example 6 (10 Mrad) | 68 | 2.1 |
| Example 7 (15 Mrad) | 75 | 2.0 |
| Example 8 (20 Mrad) | 87 | 2.1 |
| Comparative Example 1 (unirradiated) | 28 | Peeled at 120° C. |
| Comparative Example 2 (unirradiated) | 35 | Peeled at 180° C. |

Example 9

The two same laminated films of Example 1 were used. Trimethylolpropane trimethacrylate was coated on the sealing layer of each laminated film, and the two layers were heat sealed to each other at 200° C. for 3 seconds using a heating fixture. The resulting laminate was irradiated with an electron beam at an exposure of 50 Mrad using an electron beam irradiator having an acceleration voltage of 250 kV. In the heat sealed layer, there was no apparent change caused by electron beam irradiation. The laminate after electron beam irradiation was subjected to the same measurements as in Example 1. As a result, the T-peel strength was 94 g/mm and the value of programmed-temperature creep measurement was 3.6%.

When, the experiment was conducted as in Example 9 except that no coating was made on the sealing layer, there were cases that the laminate after electron beam irradiation showed expansion caused by gas generation inside the laminate and, in some areas, curing and peeling of film.

Example 10

A battery power source was prepared by interposing a separator between a positive electrode (obtained by forming, on an aluminum foil, an active material layer using $LiMn_2O_4$ as an active material) and a negative electrode (obtained by forming, on a copper foil, an active material layer using graphite as an active material), and then impregnating the resulting material with an electrolytic solution of $LiPF_6$ as an electrolyte salt dissolved in a mixed solvent consisting of 3:7 ratio by weight of ethylene carbonate and diethyl carbonate. This battery power source was interposed between the two same laminated films of Example 1. The peripheries of the laminated films were heat sealed to each other at 250° C. for 3 seconds using a heating fixture. An aluminum plate of 5 mm in thickness as a shield was placed on the resulting laminate so as to cover the battery power source portion of the laminate from the electron beam irradiation. Then, electron beam irradiation was made at an exposure of 15 Mrad, using an electron beam irradiator having an accelerated voltage of 250 kV.

Figure 9:
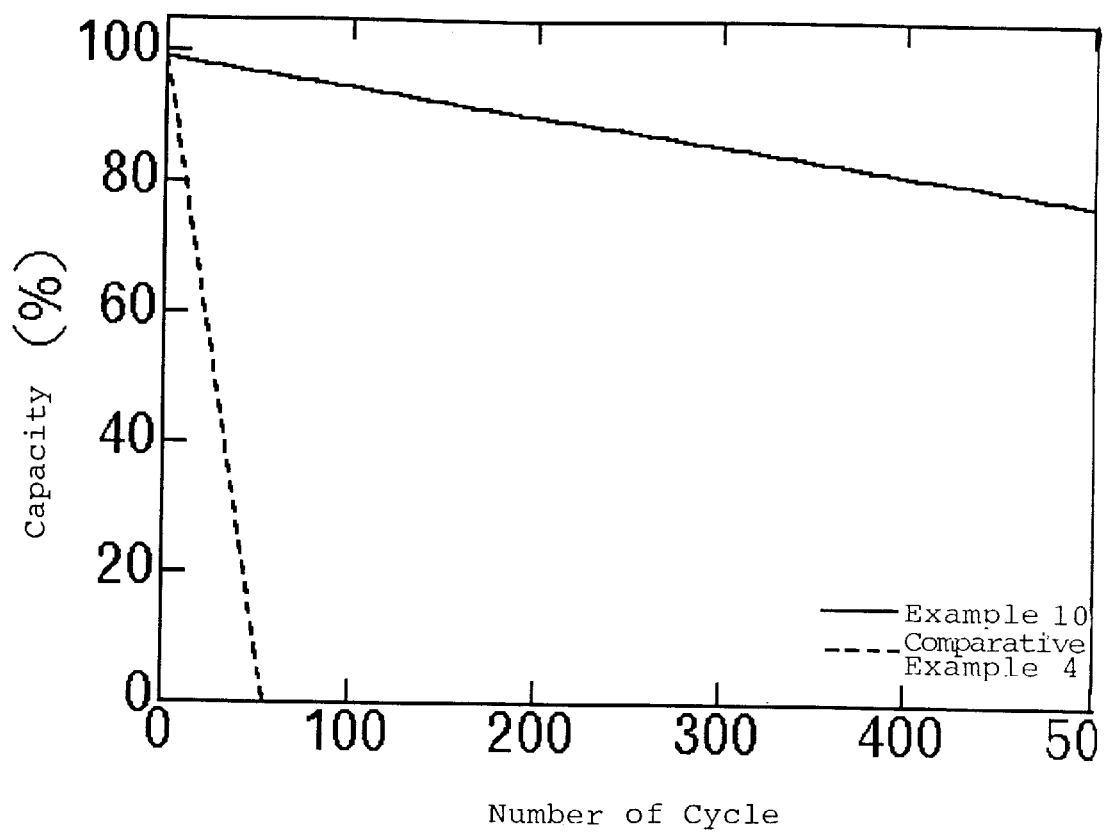
FIG. 9 is a graph showing the cycle characteristics at 20° C. of the batteries produced in Example 10 and Comparative Example 4.

The resulting battery was measured for battery performances such as cycle characteristic, temperature characteristic, internal resistance and the like. As a result, the electron beam irradiation gave no adverse effect on battery performances. The result of cycle characteristic at 20° C. is shown in FIG. 9.

The above-obtained battery was subjected to a high-temperature storage test of 130° C. for 3 hours and a safety tests such as overcharging test of 45° C., 3 C. and 12V. There was expansion of the battery per se, but there was no peeling of sealed area.

Example 11

Figure 7:
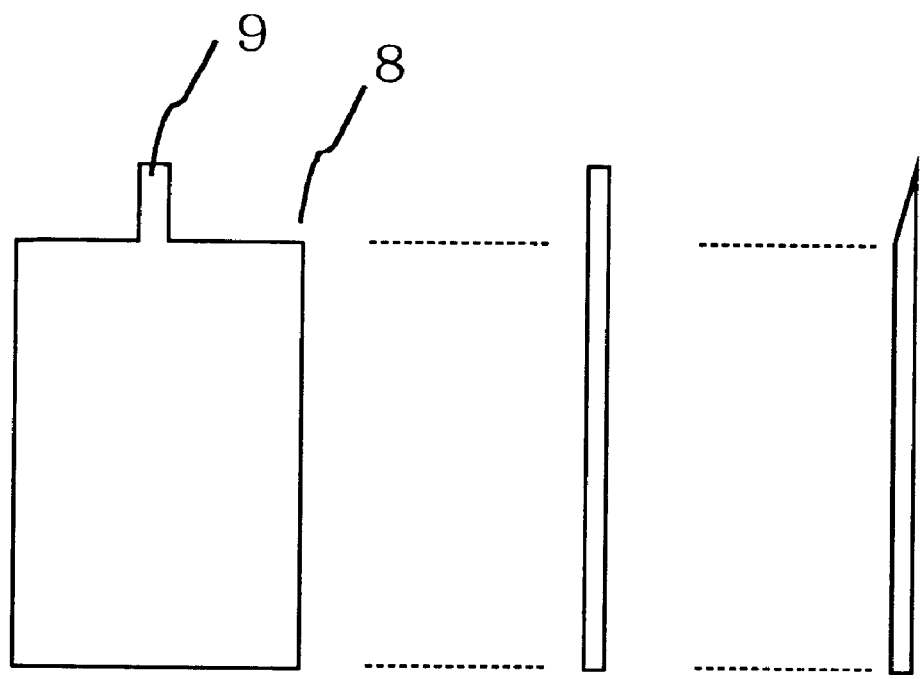
FIGS. 7(a) to 7(c) are drawings for explaining an example of the shield used in the method for production of battery according to the present invention.

A battery power source was interposed between two same laminated films and the peripheries of the films were heat sealed to each other, in the same manner as in Example 10. An aluminum plate having a tongue-shaped section as shown in FIG. 7(a) and FIG. 7(b) was placed as a shield, on one side of the resulting laminate so as to cover the battery power source portion and part of the heat sealed area. And electron beam irradiation was made to said side in the same manner as in Example 10. The resulting battery was subjected to the same tests as in Example 10. In both of the high-temperature storage test and the overcharging test, the expansion of the battery took place. The peeling was observed in the sealed area only at the electron beam-unirradiated position. That is, it was confirmed that the peeling positon of the sealed area can be predicted at the time of battery production prior to use.

Comparative Example 3

A battery power source was interposed between two same laminated films and the peripheries of the films were heat sealed to each other, in the same manner as in Example 10. Subsequent irradiation with an electron beam was not made. The resulting laminate was subjected to the same tests as in Example 10. In both of the high-temperature storage test and the overcharging test, the sealed area showed peeling with the expansion of the battery, and the battery weight decreased after the tests. The sites which caused peeling, could not be anticipated at the time of battery production, but peeling was particularly striking in the vicinities of leading electrodes.

Comparative Example 4

A battery power source was interposed between two same laminated films and the peripheries of the films were heat sealed to each other, in the same manner as in Example 10. Then, the resulting laminate was irradiated with an electron beam at the whole surface of one side, using no shield for electron beam. The battery after electron beam irradiation showed expansion, and the battery performances such as cycle characteristic were clearly inferior to those of Example 10. The result of cycle characteristic at 20° C. is shown in FIG. 9.

According to the present invention, there can be provided a method for producing a battery using a laminated film as the casing, which battery has a high sealing strength, particularly a high peeling strength at the terminals of leading electrodes without sacrificing battery performances and therefore has high reliability and safety.

According to the present invention, there can also be provided a method for producing, at high productivity and easily, a battery using a laminated film as the casing, which battery has high strength at the whole sealed area, is provided with a safety mechanism allowing gas release from a particular site when the pressure inside battery has increased owing to the happening of abnormality, and has high reliability and safety.

What is claimed is:

1. A method for producing a battery, comprising a battery power source having a positive electrode, a negative electrode and an electrolyte and a laminated film as a casing encapsulating the battery power source therein; the laminated film being composed of at least a metal foil and a polymer resin layer;

the method comprising the steps of:
heat sealing a sealing area of the laminated film, whereby encapsulating the battery power source in the laminated film; and
irradiating, with an electron beam, a portion of the heat sealed area, thereby the irradiated area crosses, in the direction along the peripheries of the heat sealed area, the overlapping areas of the heat sealed area and electrode leads projecting toward outside from the positive electrode and the negative electrode.

2. A method for producing a battery, comprising a power source having a positive electrode, a negative electrode and an electrolyte and a laminated film as a casing encapsulating the battery power source therein; the laminated film being composed of at least a metal foil and a polymer resin layer;

the method comprising the steps of:
heat sealing a sealing area of the laminated film; and
irradiating at least part of the heat sealed area of the laminated film with an electron beam while preventing the battery power source from being irradiated with the electron beam.

3. A method according to claim 2, wherein at the time of irradiation with an electron beam, a shielding means is used for shielding the battery power source from the electron beam.

4. A method according to claim 3, wherein the shielding means comprises a shield capable of shielding the battery power source from the electron beam is placed on or above the battery power source.

5. A method according to any of claim 1, wherein the electron beam irradiated area in the heat sealed area extends continuously over the entire area in the direction along the peripheries of the heat sealed area.

6. A method according to any of claim 2, wherein the electron beam irradiated area in the heat sealed area extends continuously over the entire area in the direction along the peripheries of the heat sealed area.

7. A method according to any of claim 2, wherein a portion of the heat sealed area in the direction along the peripheries of the heat sealed area is not irradiated with an electron beam to form an electron beam-unirradiated part.

8. A method according to claim 1, wherein a portion of the heat sealed area in the direction along the peripheries of the heat sealed area is not irradiated with an electron beam to form an electron beam-unirradiated part, provided that the electron beam-unirradiated part is not formed in the overlapping areas of the heat sealed area and the electrode leads.

9. A method according to any of claim 1, wherein the laminated film contains an electron beam-reactive compound at a heat sealing area which becomes the heat sealed area.

10. A method according to any of claim 2, wherein the laminated film contains an electron beam-reactive compound at a heat sealing area which becomes the heat sealed area.

11. A method according to any of claim 5, wherein the laminated film contains an electron beam-reactive compound at a heat sealing area which becomes the heat sealed area.

12. A method according to any of claim 6, wherein the laminated film contains an electron beam-reactive compound at a heat sealing area which becomes the heat sealed area.

13. A method according to any of claim 7, wherein the laminated film contains an electron beam-reactive compound at a heat sealing area which becomes the heat sealed area.

14. A method according to any of claim 8, wherein the laminated film contains an electron beam-reactive compound at a heat sealing area which becomes the heat sealed area.

15. A method according to any of claim 1, wherein, in the laminated film, a heat sealing area which becomes the heat sealed area comprising a part containing an electron beam-reactive compound and a part containing no electron beam-reactive compound.

16. A method according to any of claim 2, wherein, in the laminated film, a heat sealing area which becomes the heat sealed area comprising a part containing an electron beam-reactive compound and a part containing no electron beam-reactive compound.

17. A method according to any of claim 5, wherein, in the laminated film, a heat sealing area which becomes the heat sealed area comprising a part containing an electron beam-reactive compound and a part containing no electron beam-reactive compound.

18. A method according to any of claim 6, wherein, in the laminated film, a heat sealing area which becomes the heat sealed area comprising a part containing an electron beam-reactive compound and a part containing no electron beam-reactive compound.

19. A method according to any of claim 7, wherein, in the laminated film, a heat sealing area which becomes the heat sealed area comprising a part containing an electron beam-reactive compound and a part containing no electron beam-reactive compound.

20. A method according to any of claim 8, wherein, in the laminated film, a heat sealing area which becomes the heat sealed area comprising a part containing an electron beam-reactive compound and a part containing no electron beam-reactive compound.

21. A method according to claim 9, wherein the electron beam-reactive compound is an acrylic compound.

22. A method according to claim 10, wherein the electron beam-reactive compound is an acrylic compound.

23. A method according to claim 15, wherein the electron beam-reactive compound is an acrylic compound.

24. A method according to claim 16, wherein the electron beam-reactive compound is an acrylic compound.

25. A battery produced by a method according to claim 2.

26. A battery produced by a method according to claim 6.

27. A battery produced by a method according to claim 7.

* * * * *